Figure 1:
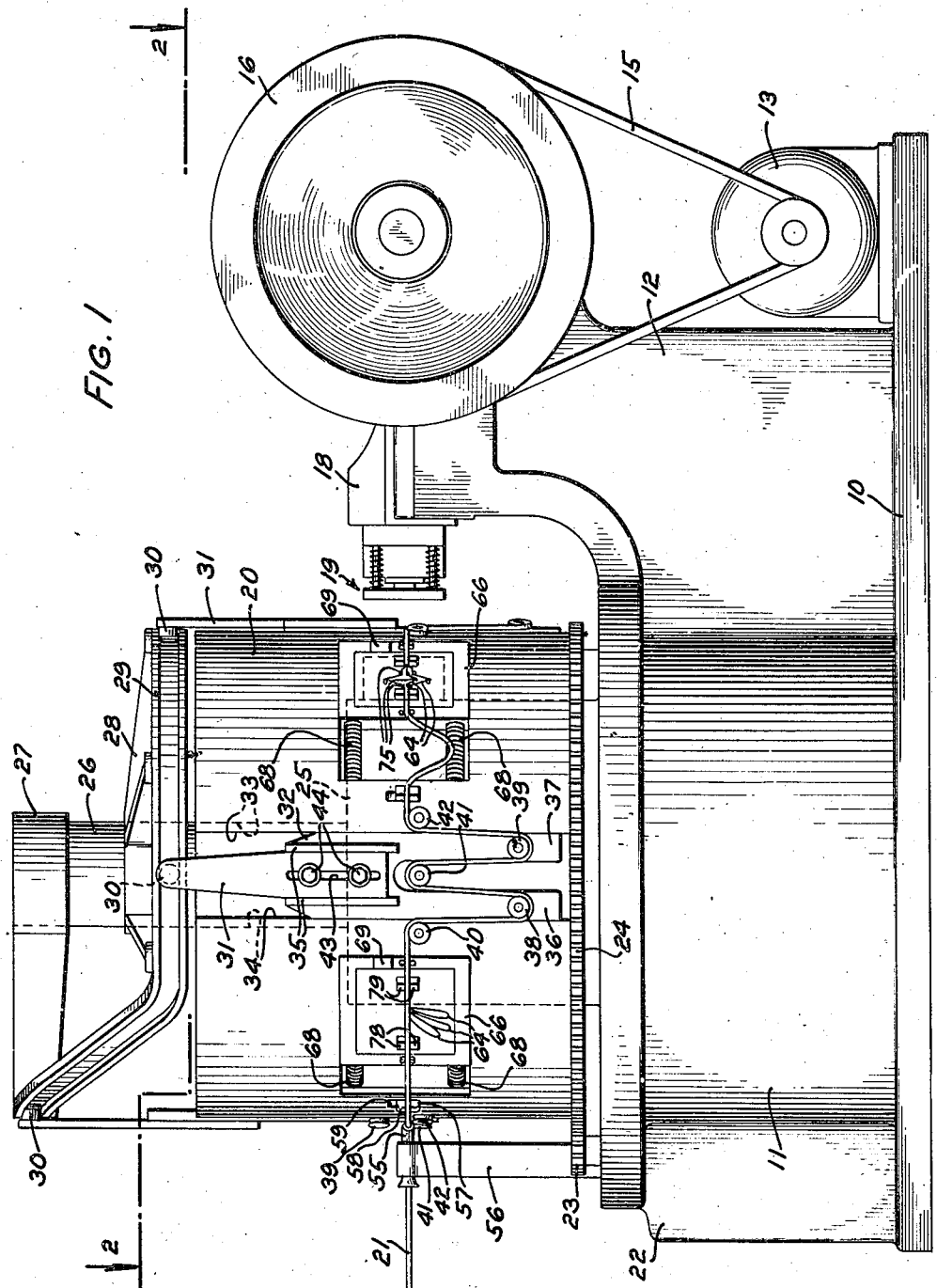

Feb. 11, 1947.  J. A. WAGNER  2,415,543
MATERIAL DISTRIBUTING APPARATUS
Filed Jan. 11, 1945  3 Sheets-Sheet 1

INVENTOR
J. A. WAGNER
BY Harry L. Duft
ATTORNEY

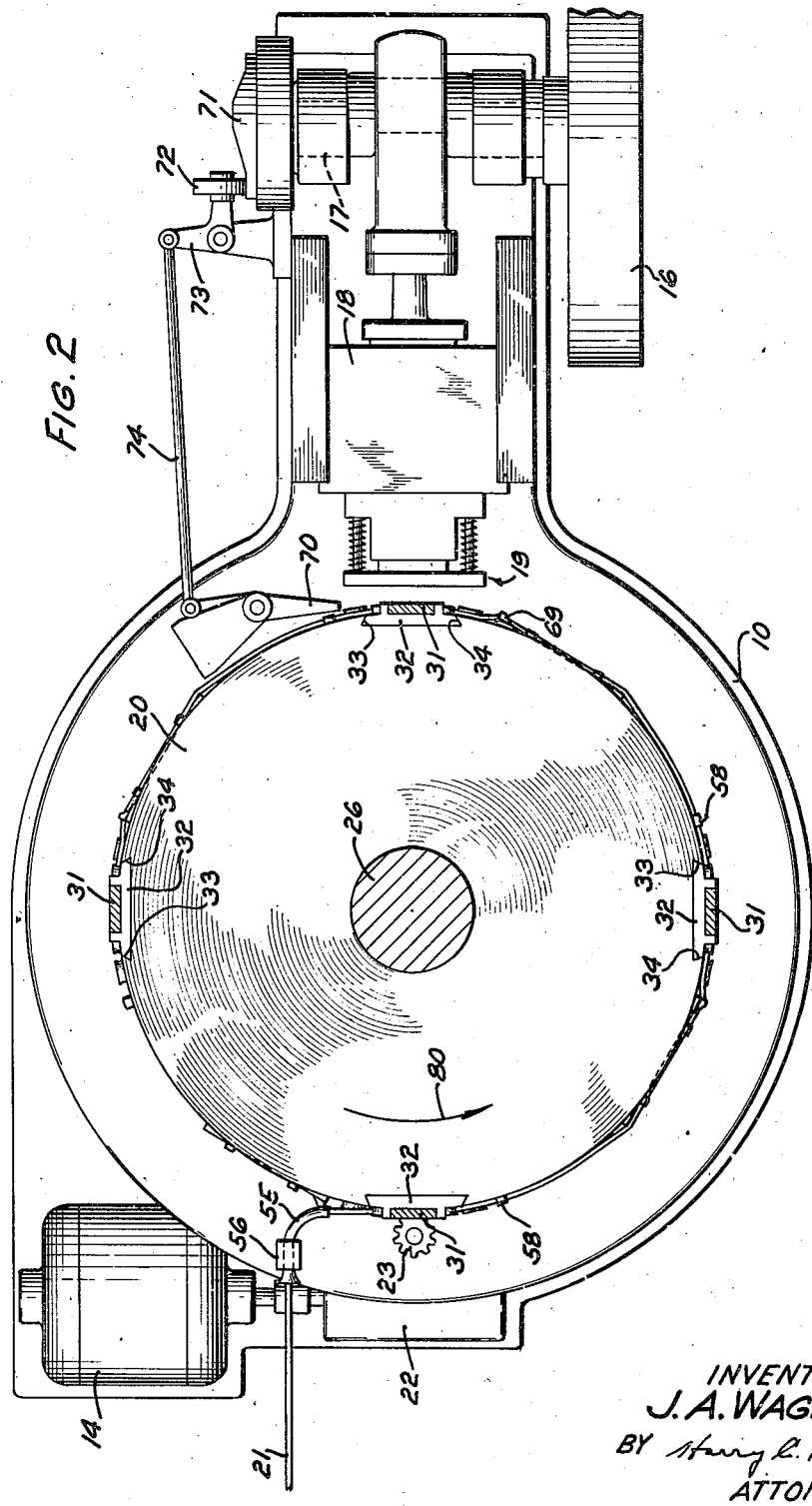

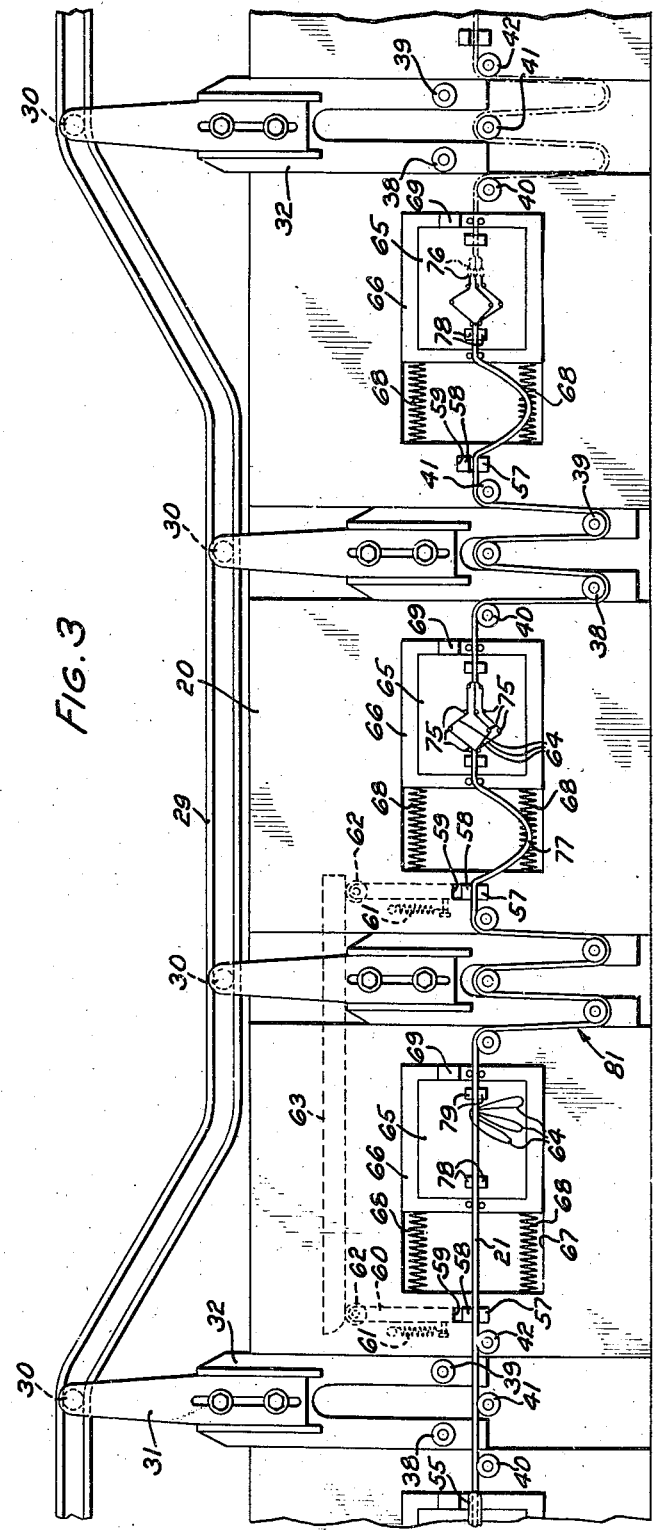

Patented Feb. 11, 1947

2,415,543

UNITED STATES PATENT OFFICE 2,415,543

MATERIAL DISTRIBUTING APPARATUS

Julius A. Wagner, Cleveland Heights, Ohio, assignor to Western Electric Company, Incorporated, New York, N. Y., a corporation of New York Application January 11, 1945, Serial No. 572,418

11 Claims. (Cl. 28—1)

This invention relates to a material distributing apparatus and more particularly to an apparatus for distributing cordage in a processing apparatus in position to be operated upon.

It is an object of the present invention to provide a simple and efficient mechanism for rapidly distributing flexible material.

In accordance with one embodiment of the invention, mechanism is provided for distributing cordage in position to be operated upon by a cordage processing machine, wherein cordage having the conductors which form its core thrown out through its cover at intervals is withdrawn from a supply thereof and fed to a rotating turret carrying plates for supporting portions of the cordage in position to be operated upon by a punch press mechanism and also supporting slidable distributors adapted to be reciprocated by a stationary cam during their travel around with the turret to form loops in the cordage for disposing lengths of cordage in a festooned or sinuous pattern between the cordage supporting plates.

A complete understanding of the invention may be had by reference to the following detailed description when considered in conjunction with the accompanying drawings, wherein Fig. 1 is a side elevational view of a turret type cord processing machine showing elements of a punch press and the turret in elevation;

Fig. 2 is a plan section taken substantially along the line 2—2 of Fig. 1 in the direction of the arrows and showing the disposition of the slides around the turret; and Fig. 3 is a developed view of the turret and the cam for reciprocating the slides.

In the drawings, wherein like reference characters designate the same parts throughout the several views, the apparatus is shown mounted on a base 10, which supports a turret standard 11 and a press standard 12. Mounted upon the base member 10 are a press driving motor 13 and a turret driving motor 14. The press driving motor, through a belt or other flexible driving element 15, rotates a fly wheel 16. The fly wheel 16 is mounted upon a drive shaft 17, which drives a cross head 18 supporting tools designated generally by the numeral 19, cooperating with other tools (not shown) mounted within a turret 20 for performing operations on cordage 21 suitably supported on the turret 20.

The turret driving motor 14, through a gear reducer 22, drives a spur gear 23 in mesh with a ring gear 24 fixed to the turret 20. The turret 20 is rotatably supported upon a suitable bearing block 25 extending upwardly from the turret standard 11. Carried by the bearing block 25 is a support post 26, which is positioned coaxially with the turret and which has brackets 27 and 28 mounted upon it for supporting the upper and lower courses, respectively, of a cam track 29. Thus the cam track 29 is fixed in position with respect to the turret 20 and is disposed in substantial alignment with the periphery of the turret to receive cam rollers 30—30 rotatably mounted adjacent the upper ends of slide actuators 31. There are four slide actuators 31 provided in the apparatus and, since all of them are of exactly the same construction, only one of them will be described in detail. The slide actuator 31 is adjustably connected to a slide 32, freely slidable in dovetail ways 33 and 34 cut into the periphery of the turret 20. The slide 32 is provided with two ridge members 35—35, which form guides for the slide actuator 31 and prevent the slide actuator 31 from tilting with respect to the slide 32. The lower end of the slide 32 is bifurcated to provide two downwardly extending portions 36 and 37, which are spaced one from another and which have freely rotatable on them pulleys 38 and 39, respectively. The pulleys 38 and 39 cooperate with pulleys 40, 41 and 42 fixed in position and rotatably mounted on the face of the turret 20, the pulley 41 being mounted between the downwardly extending portions 36 and 37 of the slide 32. The slide actuator 31 has a slot 43 formed in it for receiving a pair of machine screws 44—44 threaded into the slide 32, whereby the position of the slide 32 with respect to its actuator 31 may be adjusted within a selected range.

The cordage 21 may be withdrawn from any suitable supply thereof and directed to a guide nozzle 55 fixed in the upper end of the bracket 56, which is, in turn, mounted upon the standard 11. The nozzle 55 is positioned just slightly above the pulleys 40, 41 and 42 and cordage which has been directed through the nozzle 55 may be laid over the top of the pulleys 40, 41 and 42 and over a stationary clamping member 57 extending outwardly from the periphery of the turret 20. Cooperating with the stationary clamping member 57 is a movable clamping member 58, which is slidable in a slot 59 formed in the turret 20. The movable clamping member is carried by a push rod 60 (Fig. 3), which is normally urged upwardly by a contractile spring 61 to move the movable clamping member 58 against the upper edge of the slot 59. The push rod 60 has a cam roller 62 mounted on its upper end for engagement with a stationary cam member 63 suitably mounted on the bearing block 25, the push rod 60 being carried by the turret and there being one push rod 60 provided for each slide 32.

After the cordage has been fed to the position just described, that is, where it rests upon the pulleys 40, 41 and 42 and the movable clamping member 57, the turret may be started in operation by supplying power to the motor 14, and, when this occurs, the turret will start to rotate to carry the cam roller 60 to engagement with the stationary cam 63 and clamp the cordage between the movable and fixed clamping members 57 and 58. In arranging the cordage 21 on the pulleys 40, 41 and 42, the cordage should be so positioned that a group of conductors 64—64, which have been thrown out through the braid covering on the cordage, are positioned as shown in Figs. 1 and 3, over a cordage supporting plate 65. There are four of these plates 65 positioned about the turret 20 and each of them is mounted for reciprocation radially of the turret 20 in a supporting framework 66, which is slidably mounted in an opening 67 formed in the turret 20. The plates 65 are spring pressed to position flush with the outer surface of the frameworks 66 for cooperation with tools 19 and cooperating tools inside the turret which are not shown since they are not necessary to an understanding of the present invention. The frameworks 66 are urged to engage the right edge of the opening 67 by compression springs 68—68 and are carried in that position until they arrive at the punch press portion of the apparatus, where an abutment shoulder 69 on a framework 66 will engage a stop lever 70, which will block the movement of the framework and the plate 65 carried thereby during the operation of the punch press. As the punch press completes its cycle of operation, a cam 71 mounted on the shaft 17 will actuate a cam roller 72 mounted on a bell crank lever 73 and will, through a link 74 attached to the stop lever 70 and bell crank 73, disengage the stop lever 70 from the abutment 69 and permit the springs 68 to return the plate 65 and its supporting framework 66 to normal position, as shown in Figs. 1 and 3.

The plates 65 have a series of pins 75—75 on them for positioning the conductors 64 to be operated upon in the punch press portion of the apparatus, where terminal members 76 may be attached to the conductors and the conductors may be cut in any suitable manner. By reference to Fig. 3, it will be noted that cordage 21 is looped as shown at 77. This loop is formed in the cordage due to the fact that an operator severs the cover on the cordage at the point where the conductors 64 extend through it and the operator also positions the conductors 64 on the pins 75 to prepare them to receive the terminal 76.

An understanding of the invention will be facilitated by a consideration of the following brief description of the mode of operation of the apparatus. If, as described hereinbefore, cordage 21 drawn from a suitable supply is directed through the guide nozzle 55 and over the set of pulleys 40, 41 and 42, as shown in the left end (Fig. 3) and in position under the movable clamp 58 at the left end of Fig. 3, the apparatus will be in condition for operation. In loading the apparatus prior to the initiation of the operation, the looped-out conductors 64 should be placed at approximately the position shown in Fig. 3 with respect to the plates 65, cordage positioning members 78—78 and 79—79 being provided on the plates 65. With the cordage in this position, the punch press motor 13 may be started and the turret driving motor may then be started. When the motor 14 is started, the turret will rotate in a clockwise direction, as indicated by the arrow at 80 (Fig. 2) to move the cam roller 62 into engagement with the stationary cam 63, thus to grip the cordage 21 and withdraw it from the supply thereof. As the turret 20 continues to rotate counterclockwise, the cam roller 30 on the slide actuator 31 will follow the course of cam track 29 as indicated in Fig. 3, that is, it will first move downwardly to cam the slide 32 downwardly and force the pulleys 38 and 39 downwardly. As pulleys 38 and 39 move downwardly, cordage will be withdrawn from the supply and will be looped as shown in the second and third positions of the plate 32 in Fig. 3 to align the next group of looped-out conductors 64 with their associated plate 65. After the festoons or loops of cordage, as shown at 81, have been formed in the cordage, the covering on the cordage may be cut in any suitable manner and the cordage will then be looped as shown at 77 prior to the release of the movable clamping member 58 by the cam roller 62 moving off the stationary cam 63. The cordage thus positioned will be carried around the apparatus to a point where the framework 66 will be stopped by the lever 70 and any suitable mechanism may be provided at the punch press and associated with the turret 20 to initiate a cycle of the operation of the punch press. A suitable type of mechanism for initiating a cycle of operation of the punch press is shown in the co-pending application of R. T. Adams, Serial No. 572,413, filed January 11, 1945, wherein there is also shown in detail mechanism for attaching the terminals 76 to the cordage. After the terminals 76 have been attached to the conductors 64—64, the cord thus formed may be removed from the apparatus in any suitable manner and as the slide 32 moves from the third position, counting from the left (Fig. 3), to the fourth position, the cam roller 30 will ride up off the lower course of the cam track 29 onto the upper course of the cam track, thus retracting the slide 32 to its uppermost position just prior to the time it passes the guide nozzle 55. As the turret 20 continues to rotate, the operations described hereinbefore will be repeated and the cordage will be continuously disposed in such a manner as to facilitate attachment thereto of the terminal members 76.

What is claimed is:

1. A cord distributing apparatus comprising a rotatable turret, a plurality of guide pulleys on said turret, means for directing the cordage to said pulleys, a reciprocatory slide carried by said turret, pulleys on said slide, and means responsive to rotation of the drum for reciprocating said slide to engage the pulleys thereon with the cordage and withdraw additional cordage through the directing means, and form the cordage in festoons on the turret.

2. A cordage distributing apparatus comprising a rotatable member, cordage engaging elements on the rotatable member, means for imparting movement to the cordage engaging elements relative one to another to arrange the cordage on the rotatable member in a sinuous pattern, and clamping means on the rotatable member for clamping the cordage to the rotatable member during movement of the cordage engaging elements relative one to another.

3. A material distributing apparatus comprising a rotatable turret, pulleys on said turret for receiving material, slides mounted on said turret, means cooperating with said turret for reciprocating said slides, and pulleys on said slides for cooperation with the pulleys on the turret for positioning the material in a sinuous pattern on the turret.

4. A material distributing apparatus comprising a rotatable turret, pulleys on said turret for receiving material, means for directing material to said pulleys on the turret, slides mounted on said turret, means cooperating with said turret for reciprocating said slides, and pulleys on said slides for cooperation with the pulleys on the turret to position the material in a sinuous pattern on the turret as the slides move in one direction.

5. A material distributing apparatus comprising a rotatable turret, material clamping means on said turret, pulleys on the turret for cooperation with the clamping means to receive the material, slides mounted on said turret, means cooperating with said turret for reciprocating the slides, pulleys on the slides for cooperation with the pulleys on the turret to position the material in a sinuous pattern on the turret, and means for rendering the clamping means effective during the formation of said pattern by the cooperating pulleys.

6. The combination with a processing mechanism for processing cordage, of means for arranging the cordage in position to be processed comprising a turret operable in timed relation to the processing mechanism, cooperating fixed and movable cordage engaging elements on the turret, and stationary cam means for moving the movable cordage engaging elements with respect to the fixed cordage engaging elements to arrange the cordage in a sinuous pattern on the turret.

7. The combination with a processing mechanism for processing cordage, of means for arranging the cordage in position to be processed comprising a turret operable in timed relation to the processing mechanism, cooperating fixed and movable cordage engaging elements on the turret, means for moving the movable cordage engaging elements with respect to the fixed cordage engaging elements to arrange the cordage in a sinuous pattern on the turret, and clamping means for temporarily clamping the cordage to the turret during relative movement between the cordage engaging elements.

8. A cordage distributing apparatus comprising a rotatable turret, slides carried by said turret, a stationary cam cooperating with said slides and the turret to impart reciprocation to the slides upon rotation of the turret, cordage engaging elements fixed with respect to the turret, and cooperating cordage engaging elements carried by the slides for arranging the cordage in a sinuous pattern on the turret upon movement of the slides by the stationary cam.

9. A cordage distributing apparatus comprising a rotatable turret, slides carried by said turret, a stationary cam cooperating with said slides and the turret to impart reciprocation to the slides upon rotation of the turret, cordage engaging elements fixed with respect to the turret, cooperating cordage engaging elements carried by the slides for arranging the cordage in a sinuous pattern on the turret upon movement of the slides by the stationary cam, and clamping means carried by the turret for clamping the cordage to the turret during the forming of the sinuous pattern by the cordage engaging elements.

10. A cordage distributing apparatus comprising a rotatable turret, slides carried by said turret, a stationary cam cooperating with said slides and the turret to impart reciprocation to the slides upon rotation of the turret, cordage engaging elements fixed with respect to the turret, cooperating cordage engaging elements carried by the slides for arranging the cordage in a sinuous pattern on the turret upon movement of the slides by the stationary cam, clamping means carried by the turret for clamping the cordage to the turret during the forming of the sinuous pattern by the cordage engaging elements, and a stationary cam associated with the turret for actuating said clamping means intermittently.

11. A cordage distributing apparatus comprising a rotatable turret, slides carried by said turret, a stationary cam cooperating with said slides and the turret to impart reciprocation to the slides upon rotation of the turret, cordage engaging elemens fixed with respect to the turret, cooperating cordage engaging elements carried by the slides for arranging the cordage in a sinuous pattern on the turret upon movement of the slides by the stationary cam, clamping means carried by the turret for clamping the cordage to the turret during the forming of the sinuous pattern by the cordage engaging elements, a stationary cam associated with the turret for actuating said clamping means intermittently, and cordage guiding means for directing cordage into association with the cordage engaging elements and clamping means.

JULIUS A. WAGNER.

REFERENCES CITED

The following references are of record in the file of this patent:

UNITED STATES PATENTS

| Number | Name | Date |
|---|---|---|
| 56,643 | Veerkamp et al. | July 24, 1866 |
| 1,775,325 | Saylor | Sept. 9, 1930 |
| 1,904,885 | Seeley | Apr. 18, 1933 |